United States Patent [19]

Mourani

[11] Patent Number: 4,695,014
[45] Date of Patent: Sep. 22, 1987

[54] AIRCRAFT WING SECTION MOVEMENT APPARATUS

[75] Inventor: George D. Mourani, Huntington Beach, Calif.

[73] Assignee: Western Gear Corporation, Lynwood, Calif.

[21] Appl. No.: 614,252

[22] Filed: May 25, 1984

[51] Int. Cl.⁴ .............................................. B64C 13/24
[52] U.S. Cl. .................................... 244/213; 244/214; 244/75 R
[58] Field of Search .............. 244/211, 212, 213, 214, 244/215, 75 R, 130, 135 R; 74/89, 89.13, 89.16

[56] References Cited

U.S. PATENT DOCUMENTS

| 2,148,967 | 2/1939 | Scheu | 244/213 |
|---|---|---|---|
| 2,295,306 | 9/1942 | Tampier | 244/215 |
| 2,966,808 | 1/1961 | Grudin | 244/75 R |
| 3,008,355 | 11/1961 | Grudin | 74/801 |
| 3,036,472 | 5/1962 | Geyer . | |
| 3,036,473 | 5/1962 | Geyer . | |
| 3,147,941 | 9/1964 | Hawthorne | 244/135 R |
| 3,203,275 | 8/1965 | Hoover | 244/75 R |
| 3,640,150 | 2/1972 | Leiner et al. | 74/674 |
| 3,655,149 | 4/1972 | Williams . | |
| 3,935,754 | 2/1976 | Comollo | 244/213 |
| 3,986,689 | 10/1976 | Maltby | 244/213 |
| 4,180,222 | 12/1979 | Thornburg | 244/75 R |

FOREIGN PATENT DOCUMENTS 2126177  3/1984  United Kingdom .

Primary Examiner—Sherman D. Basinger
Assistant Examiner—Rodney Corl
Attorney, Agent, or Firm—Pretty, Schroeder, Brueggemann & Clark

[57] ABSTRACT

An actuator is positioned at the tip of an aircraft wing, preferably adjacent to a store, and operatively connected by a torque shaft to a motor mounted at the fuselage. A return shaft extends back along the wing from the actuator toward the fuselage and is attached to a pivotably movable wing section. The actuator, which includes a speed reduction gear set, drives the movable wing section through the return shaft. The wing profile extending outwardly to the actuator can be smooth and aerodynamic, the only enlargement of the profile being at the actuator itself which is adjacent to the store where the airflow is necessarily disrupted.

14 Claims, 5 Drawing Figures

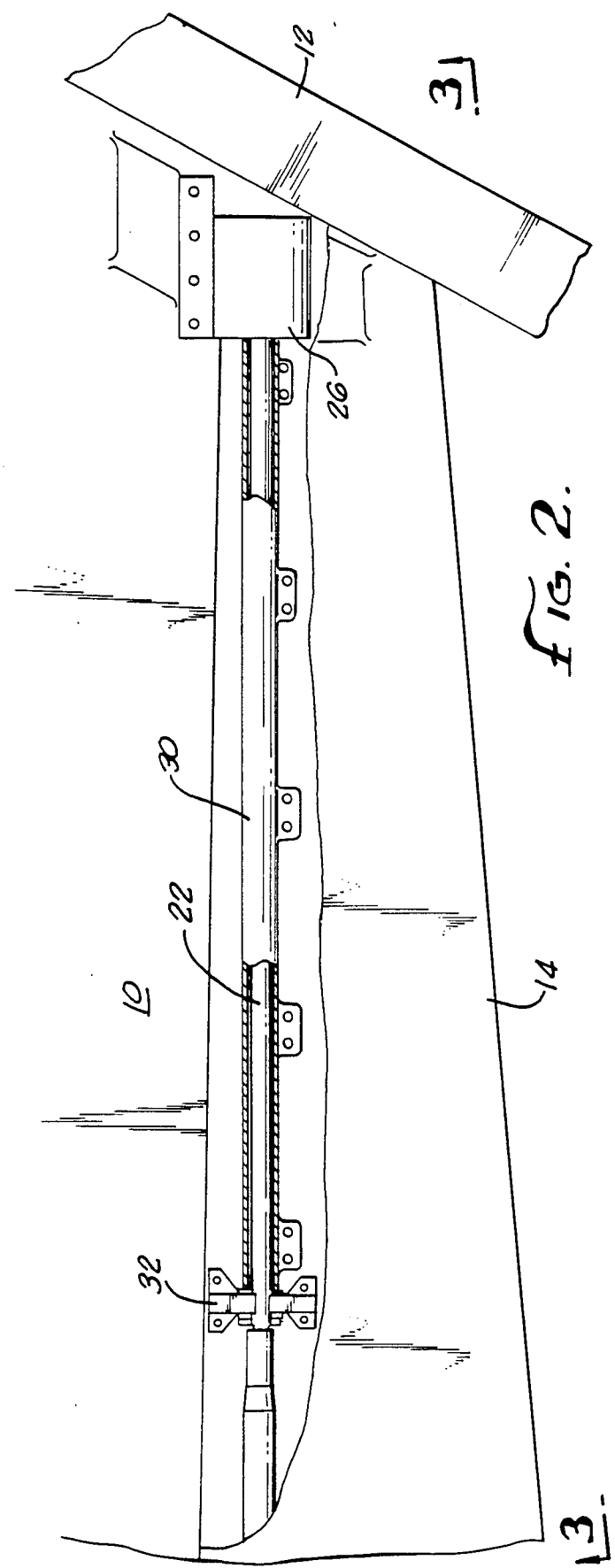
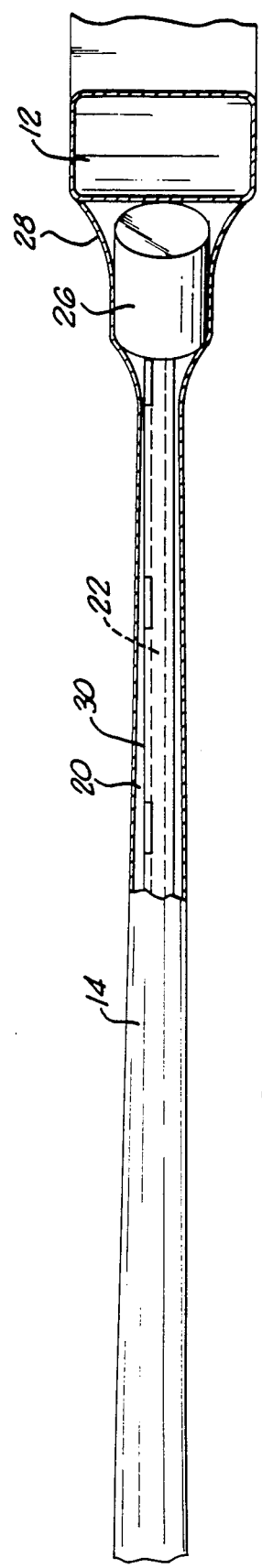

AIRCRAFT WING SECTION MOVEMENT APPARATUS

FIELD OF THE INVENTION

The present invention relates to the construction of aircraft, and more particularly to an arrangement for driving movable wing sections.

BACKGROUND OF THE INVENTION

Conventional aircraft wing structures include sections which move pivotably for control purposes. Movable flaps on the leading edges of wings are particularly useful, providing a breaking force during landings. They can also be used to cause abrupt upward movement of the aircraft, which is especially useful for evasive military maneuvers.

Motors for driving such flaps cannot be mounted in the wings themselves because of size and weight considerations. The flaps are therefore driven, in the conventional arrangement, by a torque shaft that extends outwardly through the center of the wing structure from a motor mounted at the fuselage. So that this shaft can be of the lightest construction possible, it is driven at a relatively high rotational speed which is reduced by an actuator mounted in the wing that includes a reduction gear set, usually of the planetary type. Exemplary rotary actuators are shown in U.S. Pat. Nos. 3,640,150 to Leiner; 3,008,355 to Grudin; and 2,966,808 to Grudin.

Although these actuators are made as compact as possible and provide a ratio of input speed to output speed, they are nevertheless of substantial size when compared to the vertical dimension of an aircraft wing, particularly in the case of modern thin wing military fighter aircraft.

In recent years, wing thicknesses have decreased considerably, and have reached the point at which it is impossible to accommodate a rotary actuator of sufficient force transmitting capacity without creating a bulge on the wing profile. Any such disruption of the wing profile would be highly undesirable for aerodynamic reasons.

One partial solution to this problem has been the use of a series of smaller and smaller rotary actuators progressing toward the wing tip. As the size of the actuators decreases, their capacity falls off rapidly and larger numbers of actuators are required. This concept has its limits, however, and a point is reached at which actuators of a useful size cannot be accommodated within the wing. Moreover, there is a very significant increase in cost as the size of the individual actuators is decreased and their number is increased.

The outermost portion of a movable wing flap, nearest the wing tip, often is supported by the inner portion of that flap since it cannot be attached to an actuator. It may therefore be deflected by the air pressure through a disproportionate angle. This deflection may be more pronounced in the home position or in the activated position. The result is a loss of the aerodynamic efficiency of the flap and a reduction in the preciseness of the control of the aircraft that is achievable.

It is an objective of the present invention to provide an arrangement for driving movable wing sections that can be accommodated within a relatively thin wing profile without disrupting the airflow over the wing to a greater extent than necessary. A further objective is to permit precise control of a movable wing section, particularly at the thinnest portion of the wing, without increasing the number of actuators or increasing the cost of the driving mechanism.

SUMMARY OF THE INVENTION

The present invention resides in a mechanism for moving an aircraft wing section in a hinge-like manner. It includes a motor for producing rotary motion and a torque shaft extending outwardly through the wing away from the motor and toward the wing tip. A rotary actuator is disposed at the wing tip adjacent to a store and is operatively connected to the torque shaft. A return shaft is connected to the actuator output and thus driven through the actuator at a reduced speed, this return shaft extending through the wing toward the motor and connected to the movable section.

The torque shaft may be concentric with and surrounded by the return shaft. The movable wing section can be connected to the return shaft at a plurality of spaced-apart locations to minimize any deflection of the section.

According to other aspects of the invention, a main wing section extends outwardly from the aircraft fuselage to a store. A movable wing section or flap extends along an edge of the main wing section, preferably the leading edge. A motor that produces rotary movement may be mounted on the fuselage and a torque shaft extends outwardly through the main wing section toward the store, being connected to the motor means and rotated thereby. An actuator, including a reduction gear set, preferably of the planetary type, is operatively connected to the torque shaft and is disposed adjacent to the store. A return shaft is connected to the actuator to be rotated at a reduced speed and connected to the movable wing section. The main wing section may have an aerodynamic profile that is enlarged adjacent to the store to accommodate the actuator. Inboard actuators within the wing profile may be connected to the torque shaft and directly connected to the flap.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 2 is a partially broken away fragmentary top view of the wing structure of FIG. 1;

FIG. 3 is a partially broken away front view of the wing structure taken as indicated by the line 3—3 in FIG. 2;

DESCRIPTION OF THE PREFERRED EMBODIMENT

Figure 1:
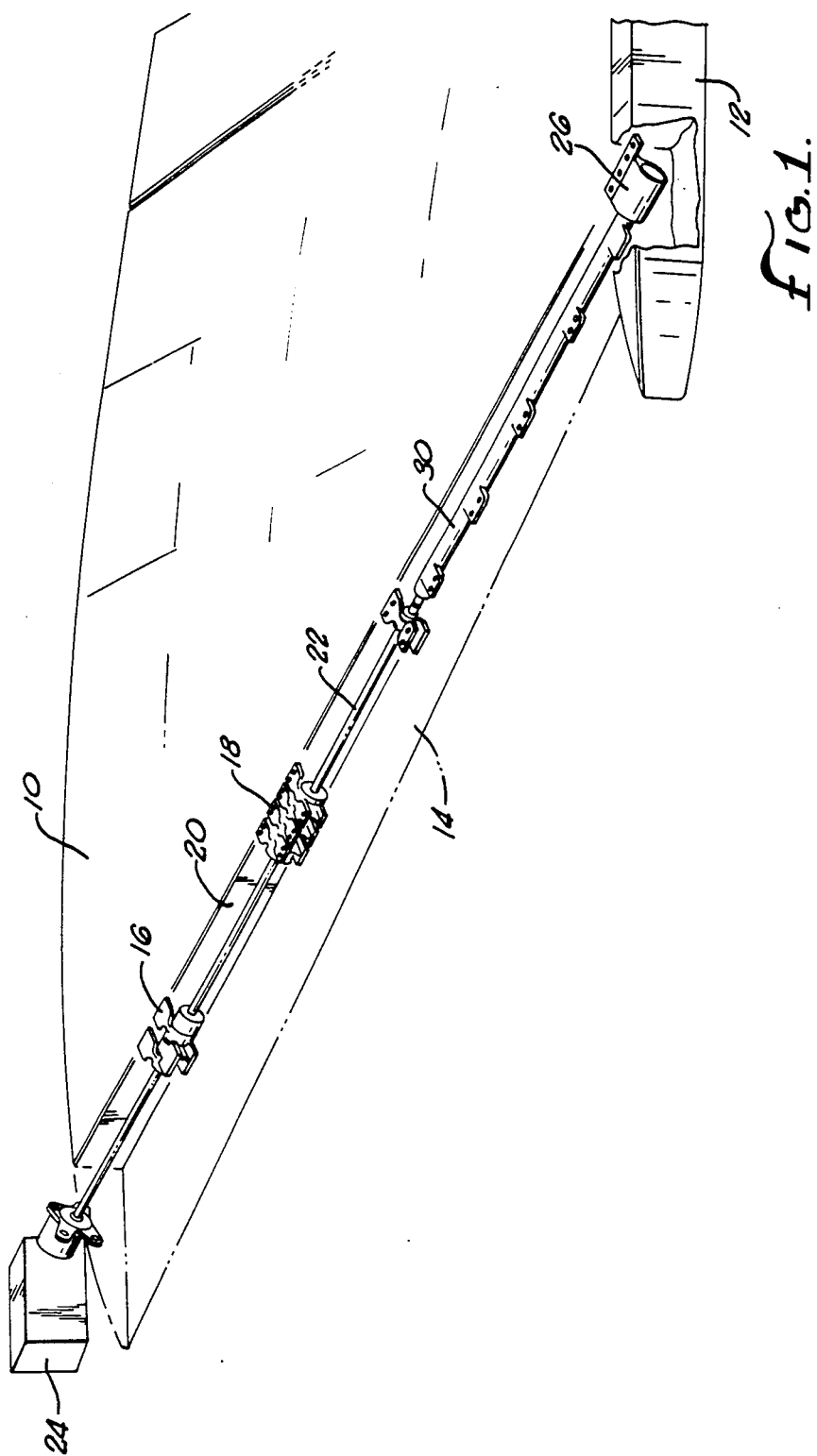
FIG. 1 is a three-dimensional diagramatic view of a wing structure constructed in accordance with the present invention, the leading edge flap being shown only in phantom lines to expose the internal mechanism.

An aircraft wing structure, shown in FIGS. 1-3 of the accompanying drawings, includes a main wing section 10 that extends outwardly from a fuselage (not shown) to a wing tip store 12. The store 12, which may be, for example, an auxillary fuel tank or an armament, has a substantially greater vertical dimension than the wing itself.

As in the case of many high speed aircraft, such as fighter planes, the wing profile is as thin as structurally possible for aerodynamic reasons, as best shown in FIG. 3. Improvements in airframe technology have permitted the wing minimum thickness to be reduced substantially without sacrificing the required structural strength and rigidity. The wing profile from the fuselage to the store 12 is smooth and free of disruptive aerodynamic effects, but the store, or the outboard wing tip in the absence of a store, has an unavoidable adverse aerodynamic effect that must be accepted.

Extending along the leading edge of the main wing section 10 is a pivotably movable wing section in the form of a leading edge flap 14. This flap 14 has a home position in which it is aligned with the main wing section 10 and can be moved downward in a hinge-like manner into an activated position. It is also usually possible to move the flap 14 upwardly through a smaller angle.

The flap 14 is supported by the main wing section 10 and, in the exemplary arrangement, its relative position is controlled by a plurality of conventional inboard single slice rotary actuators 16 and multi-slice rotary actuators 18. Each actuator 16 and 18 is contained within the wing profile, being mounted on an internal wing spar 20 partially enclosed within the main wing section 10 and extending longitudinally along the flap 14.

The single slice inboard actuator 16, located in a thicker portion of the wing profile, can be larger and heavier. Toward the longitudinal center of the wing is the multi-slice actuator 18, which is smaller vertically to fit within the thinner confines of the wing profile. It is therefore necessary to use a multi-slice construction, which in essence includes a group of the smaller actuators, to generate sufficient driving force. In accordance with the design specifications of a particular aircraft there may be, and usually are, a series of additional groupings of progressively smaller inboard rotary actuators 16 and 18. In some aircraft there are a series of leading edge flaps arranged along the main wing section, each with its own actuators.

Each inboard actuator 16 or 18 includes at least one set of planetary speed reduction gears and is arranged to be driven by a torque shaft 22 that extends longitudinally through the wing from a motor 24 mounted on the fuselage. The actuators 16 and 18 drive the flap 14 at a reduced speed but increased torque.

Figure 4:
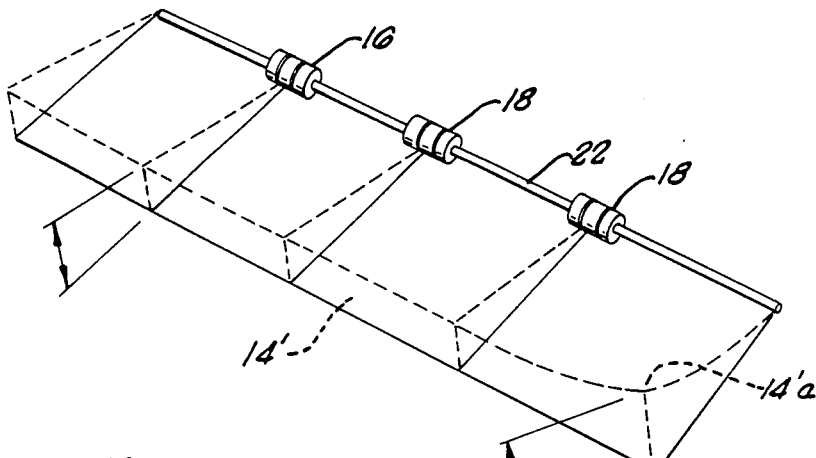
FIG. 4 is a diagramatic three-dimensional view of a leading edge flap and associated structure of a previously known construction, the flap being shown in its home position in phantom lines and in an activated position in solid lines.

The thinnest portion of the wing, nearest the store 12, cannot accommodate a rotary actuator that is large enough to be effective if the smooth wing profile of a high performance thin wing aircraft is to be maintained. It is possible to omit actuators in the thinnest part of the wing, in which case the outermost portion of the leading edge flap 14 is supported only by the inner portion, as in the case of the flap 14' shown in FIG. 4. If the flap 14' were sufficiently rigid, it would not be deflected substantially by the air pressure or at least the deflection would be uniform throughout its length. However, the limited tortional rigidity of the flap 14' is such that in previously known arrangements of this type the outermost corner 14'a of the flap may be deformed upwardly under load when, for example, the flap is raised to its home position, as illustrated in phantom lines in FIG. 4. The result is that the effectiveness of the flap is diminished and precise control of the aircraft is made more difficult because the deformation may be greater in one position than another as the load varies, as shown by the arrows in the FIG. 4.

According to the invention, this problem is solved by mounting a relatively large single slice outboard rotary actuator 26 of the planetary gear type at the wing tip adjacent to the store 12 and connected to outer end of the torque shaft 22. Although an enlargement 28 of the wing profile is required to accommodate this outboard actuator 26, as shown best in FIG. 3, the adverse aerodynamic effect is minimized because the enlargement is directly adjacent to the store 12 where disruption of the airflow must occur, even in the absence of the actuator. Generally, the wing tip actuator 26 can be made large enough that a single slice construction is sufficient at this location.

The torque shaft 22 is concentric with and surrounded by a larger return shaft 30, both shafts being hollow. The return shaft is driven by the wing tip actuator 26 at a reduced rotational speed, just as the flap 14 is driven at a reduced speed by the inboard actuators 16 and 18.

Figure 5:
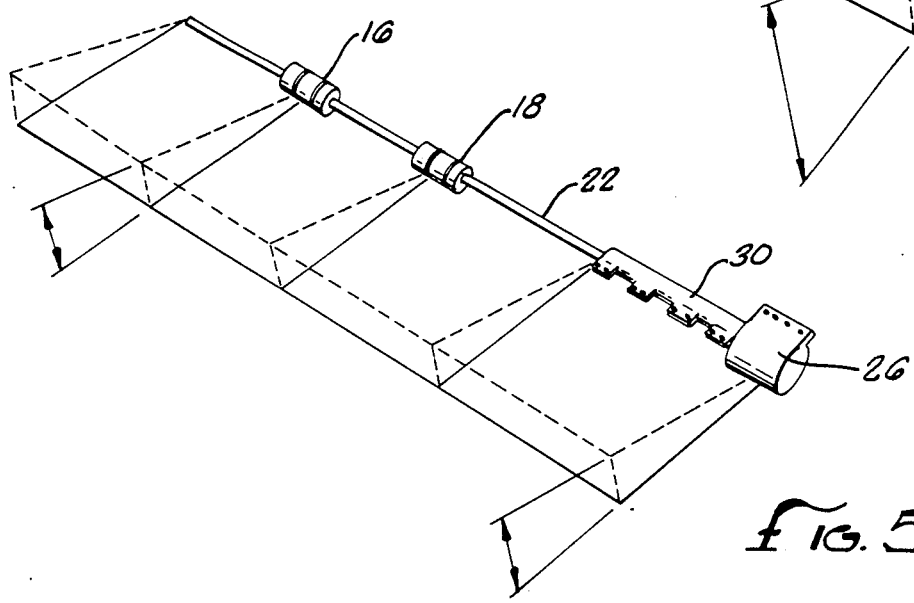
FIG. 5 is a diagrammatic view, similar to FIG. 4, of the leading edge flap and associated structure of the present invention.

The return shaft 30 extends inwardly toward the fuselage, almost reaching the nearest of the inboard actuators 18. At its inner end it is supported and positioned by a bracket 32 (FIG. 2) that is attached to the main wing section 10 and the flap 14. Since the rotary driving forces are thus applied along the entire length of the outer section of the flap 14, a high degress of tortional rigidity of the flap is not required for precise control. As illustrated in FIG. 5, any deflection of the flap 14 is substantially uniform throughout its length in both the home position (shown in phantom lines) and the activated or lowered position.

It will be appreciated from the above description that the present invention permits precise control of a movable wing section that extends fully to the wing tip without unacceptable adverse aerodynamic effects. It also reduces the cost and complexity of the wing flap mechanism.

While a particular form of the invention has been illustrated and described, it will be apparent that various modifications can be made without departing from the spirit and scope of the invention.

I claim:

1. An aircraft wing structure extending outwardly from a fuselage to a wing tip store, said wing structure comprising:
   a main wing section extending from said fuselage to said store;
   a movable wing section extending along an edge of said main wing section;
   motor means for producing rotary movement;
   a torque shaft extending outwardly through said main wing section toward said store and connected to said motor means to be rotated thereby;
   rotary actuator means including a reduction gear set connected to said torque shaft and enclosed by an enlarged aerodynamic profile portion of said wing sections, said enlarged profile portion being located adjacent to said store for driving said movable wing section at a reduced speed in response to rotation of said torque shaft; and
   a return shaft concentric with said torque shaft and disposed around said torque shaft and operatively connected to said rotary actuator means to be rotated thereby at said reduced speed, extending toward said fuselage and connected to said movable wing section, thereby transmitting rotary forces from said actuator means to said movable wing section to move said wing section in a hinge-like manner.

2. The wing structure of claim 1 wherein said return shaft is connected to said movable wing section at a plurality of spaced-apart locations.

3. The wing structure of claim 1 wherein:
said return shaft is connected to said movable wing section at a plurality of spaced-apart locatios extending inwardly from said store.

4. An aircraft wing structure extending outwardly from a fuselage to a wing tip store, said wing structure comprising:
a main wing section extending from said fuselage to said store:
a movable wing section extending along an edge of said main wing section;
motor means for producing rotary movement;
a torque shaft extending outwardly through said main wing section toward said store and operatively connected to said motor means to be rotated thereby;
inboard rotary actuator means operatively connected to said torque shaft, disposed within said wing and arrayed along said movable wing section for moving said section in a hinge-like manner in response to rotation of said torque shaft;
outboard rotary actuator means operatively connected to said torque shaft and enclosed by an enlarged aerodynamic profile portion of said wing section, said enlarged portion being located adjacent to said store, for driving said movable wing section in a hinge-like manner in response to rotation of said torque shaft; and
a return shaft concentric with said torque shaft and disposed around said torque shaft and operatively connected to said outboard rotary actuator means to be rotated thereby to transmit rotary forces to said movable wing section.

5. The wing structure of claim 4 wherein said return shaft is connected to said movable wing section at a plurality of spaced-apart locations.

6. The wing structure of claim 4 wherein
said return shaft is connected to said movable wing section at a plurality of spaced-apart locations extending inwardly from said store.

7. The wing structure of claim 4 wherein said rotary actuator means each include at least one speed reduction gear set of the planetary type.

8. The wing structure of claim 4 having an aerodynamic profile that is enlarged adjacent to said store to enclose said outboard rotary actuator means but is otherwise smooth.

9. The wing structure of claim 4 wherein said outboard rotary actuatory means is a single actuator of single slice construction.

10. The mechanism of claim 4 wherein said inboard rotary actuator means is of the multi-slice type.

11. An aircraft wing structure extending outwardly from a fuselage to a wing tip store, said wing structure comprising:
a main wing section extending from said fuselage to said store;
a movable wing section extending along the leading edge of said main wing section;
motor means for producing rotary motion mounted on said fuselage;
a torque shaft extending outwardly through said main wing section toward said store and operatively connected to said motor means to be rotated thereby;
a plurality of inboard rotary actuator means connected to said torque shaft, disposed within said wing sections and arrayed along said movable wing section for moving said movable wing section in a hinge-like manner in response to rotation of said torque shaft; and
outboard rotary actuator means operatively connected to said torque shaft disposed within said wing section adjacent to said store for driving said movable wing section in response to rotation of said torque shaft; and
a return shaft connected to said movable wing section at a plurality of spaced-apart locations to be rotated and thereby to transmit rotary forces to said movable wing section, said return shaft being concentric with and surrounding said torque shaft;
said wing having an enlarged portion adjacent to said store that encloses said outboard actuator and otherwise has a smooth aerodynamic profile.

12. In an aircraft wing structure extending outwardly from a fuselage to a wing tip and having a pivotably movable wing section extending therealong, a mechanism for moving said section comprising:
motor means for producing rotary movement;
a torque shaft extending outwardly through said wing toward said tip and connected to said motor means to be rotated thereby;
rotary actuator means disposed adjacent to said tip and operatively connected to said torque shaft for driving said movable wing section at a reduced speed in response to rotation of said torque shaft; and
a return shaft concentric with said torque shaft and disposed around said torque shaft and operatively connected to said rotary actuator means to be driven at said reduced speed, said return shaft extending through said wing toward said motor means and connected to said movable wing section, thereby transmitting forces from said rotary actuator means to said movable wing section.

13. The wing structure of claim 12 wherein a store is mounted on said wing tip adjacent to said rotary actuator.

14. The wing structure of claim 12 having an aerodynamic profile that is enlarged adjacent said tip to enclose said actuator means.

* * * * *